(12) United States Patent
Radulescu et al.

(10) Patent No.: US 9,764,598 B2
(45) Date of Patent: Sep. 19, 2017

(54) HEAVY GOODS VEHICLE DRIVEN AXLE TIRE TREAD

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Robert Ciprian Radulescu, Clermont-Ferrand (FR); Fabien Marlier, Clermont-Ferrand (FR); Benjamin Quantinet, Clermont-Ferrand (FR); Maxime Rolland, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 402 days.

(21) Appl. No.: 14/390,403

(22) PCT Filed: Apr. 5, 2013

(86) PCT No.: PCT/EP2013/057223
§ 371 (c)(1),
(2) Date: Nov. 3, 2014

(87) PCT Pub. No.: WO2013/150143
PCT Pub. Date: Oct. 10, 2013

(65) Prior Publication Data
US 2015/0059943 A1 Mar. 5, 2015

(30) Foreign Application Priority Data
Apr. 5, 2012 (FR) ..................................... 12 53170

(51) Int. Cl.
*B60C 11/11* (2006.01)
*B60C 11/12* (2006.01)
*B60C 11/03* (2006.01)
*B60C 11/04* (2006.01)
*B60C 11/00* (2006.01)

(52) U.S. Cl.
CPC ........ *B60C 11/0323* (2013.01); *B60C 11/033* (2013.01); *B60C 11/04* (2013.01); *B60C 11/12* (2013.01); *B60C 11/1218* (2013.01); *B60C 11/1281* (2013.01); *B60C 2011/0033* (2013.01)

(58) Field of Classification Search
CPC ... B60C 11/1281; B60C 11/12; B60C 11/033; B60C 11/0323
See application file for complete search history.

(56) References Cited

U.S. PATENT DOCUMENTS 5,316,062 A * 5/1994 Lurois ................. B60C 11/0309
152/209.22
2003/0201048 A1* 10/2003 Radulescu ......... B29D 30/0606
152/209.25

(Continued)

FOREIGN PATENT DOCUMENTS

JP      2003 159910 A    6/2003
WO      02/38399 A2    5/2002
WO    WO-2011/107171 A1 * 9/2011

OTHER PUBLICATIONS

International Search Report for PCT/EP2013/057223 dated Jul. 25, 2013.

*Primary Examiner* — Steven D Maki
(74) *Attorney, Agent, or Firm* — Dickinson Wright PLLC

(57) ABSTRACT

Tread having a maximum thickness PMU of material to be worn away during running, having: at least two grooves of circumferential overall orientation delimiting at least one (Continued)

intermediate row and two edge rows, a plurality of cuts of transverse overall orientation on each intermediate and edge row, representing, in the new state, a void of total volume Vco open onto the tread surface, at most equal to 13% of the total volume of the tread, channels or cavities extending under the tread surface in the new state, adapted to form new grooves after the tread has partially worn away, and having, in the initial state, a total volume Vcc at least equal to 30% of the total void volume Vco in the new state, intermediate rows of suffix (i) and edge rows of suffix (e) each provided with a plurality of cuts of transverse or oblique orientation distributed over each row evenly or near-evenly with a mean pitch of Pi and Pe respectively, having mean depths, Di and De respectively, which are at least equal to 20% of the thickness PMU and at most equal to thickness PMU, wherein:

on the edge rows, Pe is such that $1.30<Pe/De<3.00$, and on the intermediate rows, Pi satisfies $1.00<Pi/Di<1.70$, and Pe is greater than Pi.

8 Claims, 2 Drawing Sheets

(56) References Cited

U.S. PATENT DOCUMENTS

| | | | | |
|---|---|---|---|---|
| 2011/0048603 | A1* | 3/2011 | Kleffmann | B60C 11/04 152/209.21 |
| 2012/0267020 | A1* | 10/2012 | Buchinger-Barnstorf | B60C 11/045 152/209.18 |

* cited by examiner

Section on II-II

Section on III-III

Section on IV-IV

HEAVY GOODS VEHICLE DRIVEN AXLE TIRE TREAD

This application is a 371 national phase entry of PCT/EP2013/057223, filed 5 Apr. 2013, which claims benefit of FR 1253170, filed 5 Apr. 2012, the contents of which are incorporated herein by reference for all purposes.

BACKGROUND

1. Field

The present disclosure relates to tires for vehicles of the heavy goods vehicle type and more particularly to the treads of such tires intended to be fitted to the driven axles of heavy goods vehicles.

2. Description of Related Art

In general, a tire for a heavy goods vehicle such a lorry, bus, tractor, comprises a carcass reinforcement comprising a plurality of reinforcers arranged radially, namely making an angle of or close to 90° with the circumferential direction, this carcass reinforcement being itself surmounted by a crown reinforcement extending in the circumferential direction. This crown reinforcement is itself surmounted on its radially outer surface by a tread made with at least one rubber compound of which the radially outermost part forms a tread surface intended to come into contact with the roadway when the tire is being driven on.

In combination with this internal structure of the tire it is known practice to provide the tread, namely that part of the tire that is intended to come into contact with the ground during driving and to be worn away during driving, with a tread pattern made up of raised elements delimited by grooves whether these be orientated circumferentially, transversely or obliquely. The purpose of such a tread pattern is to give the tread good performance when driving on a dry roadway and on a roadway covered with water, notably in the rain.

In order to improve tread performance without, however, excessively lowering the shear rigidity of said treads, it is known practice to form on the tread surface a plurality of edge corners oriented transversely or obliquely in order to cut into the film of water on a roadway to ensure good contact between the tread and the roadway. One way of obtaining such edge corners is to provide the tread with a plurality of cuts, these cuts taking the form of grooves or the form of sipes. In the present application, sipes are distinguishable from grooves in that sipes have a width suited to allowing, during running, at least partial contact between the opposing walls that delimit these sipes and notably when these sipes are in the contact patch in which the tire makes contact with the ground, which is something that the grooves do not do under normal conditions of use of the tire.

Combined with this need to improve grip performance through the presence of edge corners formed by the transverse cuts, it is also a requirement that tread performance be lasting, namely for satisfactory performance to be achieved even following more or less pronounced partial wearing. The partial wearing of a tread means a degree of wear that corresponds to a tread thickness at most equal to the total thickness of tread that can be worn away before the tire has to be changed in order notably to comply with regulations.

Forming a plurality of cuts in a tread, while advantageous in improving grip performance notably on wet ground, results in a significant drop in the rigidity of the tread, through the absence of material, and this may prove disadvantageous in terms of wear. This is more especially the case when the tread has to offer the user lasting performance and the total thickness to be worn away has accordingly to be relatively great. On average, for a tire intended to be mounted on a driven axle, this thickness is at least equal to 18 mm, this thickness taking account of the additional thickness needed for what is referred to as the "regrooving" operation.

Patent application WO 02/38399-A2 describes a tread for a heavy goods vehicle tire, this tread comprising a plurality of circumferential and transverse grooves. The transverse grooves are formed of an alternation of void zones and incisions so that it has a volume of voids that open onto the tread surface in the new state and a volume of hidden voids, these hidden voids being intended to open after that same tread has become partially worn. The presence of hidden voids—which appear with wear, means that the rigidity in the initial state can be greater but with grip performance still being assured regardless of the degree of tread wear.

Patent application WO 2011/039194-A1 describes a new type of tread block whereby lasting tread performance is obtained through special management of the void volumes in the said tread.

In that patent application WO 2011/039194-A1, there is described a tread for a heavy goods vehicle tire which tread is provided with at least one groove delimited by opposing lateral walls, this groove opening onto the tread surface discontinuously as a plurality of portions which are open to the outside of the tread, the lateral walls being connected by a part that forms the bottom of the groove. These open portions comprise two ends continuing under the tread surface in the form of first channels, the channels having inlets connected to the ends of the open portions. Each of these grooves offers a drainage capacity in the new state because of the continuity with the channels; this drainage capacity is fulfilled in the worn state when, in combination with these first channels, continuous second channels are wholly formed under the tread surface, these second channels being connected or not connected to the first channels. In this way it is possible to limit the reduction in the tread rigidity, notably shear rigidity under tangential loading that occurs during running in contact with a roadway while at the same time maintaining a suitable capacity of the grooves to remove the water present on the roadway.

By comparison with the prior art, this type of groove—while providing the minimum level of drainage thanks to the presence of a suitable voids volume open to the tread surface—allows the tread to maintain rigidities, notably shear rigidity, which are greater than that of treads provided with grooves of depths at least equal to the thickness of material to be worn away during running.

Definitions

The void volume ratio of a tread pattern of a tread in the new state is equal to the ratio between the volume of the voids (formed notably by grooves, sipes, cavities) delimited by the raised elements (blocks, ribs) and the total volume of the tread comprising the volume of material to be worn away and the volume of the voids. A low void volume ratio indicates a small volume of voids in relation to the volume of the tread. A void volume can also be defined for each level of wear.

The void surface ratio of a tread pattern of a tread is equal to the ratio between the surface area of the voids on the tread surface at a given state of wear in relation to the surface area of the tread surface plus the surface area of the voids on the tread surface. This void surface ratio can be evaluated in the new state and at various levels of wear of the tread. It is known that this void surface ratio needs if possible to remain constant if performance is to be lasting with respect to wear.

A block is a raised element formed on a tread, this element being delimited by voids or grooves and comprising lateral walls and a contact face, the latter being intended to come into contact with the roadway during driving.

A rib is a raised element formed on a tread, this element being delimited by two grooves. A rib comprises two lateral walls and a contact face, the latter being intended to come into contact with the roadway.

The total thickness E of a tread is measured, on the equatorial plane of the tire provided with this tread, between the tread surface and the radially outermost part of the crown reinforcement in the new state.

A tread has a maximum thickness PMU of material to be worn away during running, this maximum thickness PMU being less than the total thickness E.

A radial direction means a direction perpendicular to the axis of rotation of the tire (this direction corresponds to the direction of the thickness of the tread).

An axial direction means a direction parallel to the axis of rotation of the tire.

A circumferential or longitudinal direction means a direction which is tangential to any circles centred on the axis of rotation. This direction is perpendicular both to the axial direction and to a radial direction.

A cut means, generically, either a groove or a sipe and corresponds to the space delimited by the walls of material that face one another and are distant from one another by a non-zero distance (referred to as the "width of the cut"). What differentiates a sipe from a groove is precisely this distance; in the case of a sipe, this distance is suited to allowing the opposing walls that delimit the said sipe to come at least partially into contact at least as the sipe enters the contact patch in which the tire is in contact with the roadway. In the case of a groove, the walls of this groove cannot come into contact with one another under usual running conditions.

The conditions of use of the tire, as notably defined by the E.T.R.T.O standard, specify the reference inflation pressure corresponding to the load bearing capability of the tire given by its load index and speed rating.

The contact patch in which the tire is in contact with the roadway is determined with the tire static, and used to calculate a mean value for the contact patch length.

The equatorial plane or median plane corresponds to a plane perpendicular to the axis of rotation of the tire and which divides the tire into two equal or substantially equal parts.

SUMMARY

There is a need for a tread for a tire which is intended more particularly to be fitted to a driven axle of a heavy goods vehicle, namely an axle on which the tires and therefore the treads are subjected to driving and/or braking loads, this tread providing the tire simultaneously with improved grip performance on wet roadways regardless of the level of tread wear, with improved wearing performance and with improved performance in terms of how the tire behaves on a dry roadway, it being necessary for these improvements to have the least possible impact on the degree to which performance is lastingly maintained with tread wear.

Thus, the tire for a heavy goods vehicle according to an embodiment of the invention, comprises a carcass reinforcement surmounted by a crown reinforcement, this crown reinforcement extending on either side of an equatorial plane that divides the tire into two equal or substantially equal parts, and radially on the outside of this crown reinforcement, a tread having a tread surface to come into contact with the roadway, this tread having a width W and a total thickness E, this total thickness E corresponding to the total thickness of material measured on the equatorial plane between the tread surface and the radially outermost part of the crown reinforcement, this tread having a maximum thickness PMU of material to be worn away during running, this maximum thickness PMU being at most equal to the total thickness E.

This tread comprises at least two circumferential grooves delimiting at least one intermediate row of suffix (i) and two edge rows of suffix (e), these edge rows axially delimiting the tread in the width W thereof. Furthermore, this tread comprises a plurality of transverse cuts which are formed on each of the intermediate and edge rows. All of the grooves and cuts that open onto the tread surface in the new state and irrespective of the orientation thereof, and which in the new state represent a total volume of voids open onto the tread surface having a volume Vco, this volume Vco being at most equal to 16% of the total volume Vt of the tread (this volume Vt being equal to the sum of the volumes of material to be worn away Vmu and of all the voids, whether or not these are open onto the tread surface in the new state).

This tread further comprises channels or cavities extending under the tread surface in the new state, these channels forming a total hidden-voids volume Vcc and are intended to form new grooves after the tread has partially worn away and before the said tread becomes fully worn.

In the initial state, this tread is such that the total hidden-voids volume Vcc is at least equal to 30% of the volume Vco of voids opening onto the tread surface in the new state.

The intermediate rows of suffix (i) and the edge rows of suffix (e) are each provided with a plurality of transverse or oblique cuts (namely cuts making a mean angle of 50° at most) distributed over each row evenly or near-evenly with a mean pitch of respectively Pi in the case of the intermediate rows of suffix (i) and Pe in the case of the edge rows of suffix (e). These cuts have mean depths equal to Di and De respectively. These depths Di and De are at least equal to 20% of the thickness PMU.

These transverse cuts take the form either of sipes or of grooves or a combination of sipes and grooves. A sipe differing from a groove in that the walls delimiting it come into contact at least partially as it enters the contact patch in which the tire is in contact with a roadway during running under conditions of use.

This tread is characterized in that:

on the edge rows, the mean pitch of the cuts is determined so that the relationship $1.30 < Pe/De < 3.00$ is satisfied, and on the intermediate rows, the mean pitch of the cuts is determined so that the relationship $1.00 < Pi/Di < 1.70$ is satisfied, and the pitch Pe of the cuts on the edge rows is greater than the pitch Pi on the intermediate rows.

For preference, the pitch Pe of the cuts on the edge rows is determined so that it is between 1.25 and 1.80 times the pitch Pi of the cuts on the intermediate rows.

Thanks to these special structural arrangements, it is possible to provide a tread, this tread having a volume of material to be worn away which may be appreciably reduced in comparison with that of the treads commonly in use prior to the invention, with a great many edge corners of transverse overall orientation both on the intermediate rows and on the edge rows without the endurance of this tread being in any way compromised by the presence of these numerous sipes. It is thus possible to adjust the rigidities between the intermediate rows and the edge rows of a tread in order to achieve the desired performance. This is not entirely possible with treads of the prior art which, given their great thickness and the fact that the total volume of voids open onto the tread surface in the new state is generally greater than 16% of the volume of material to be worn away, entail the formation, on the edge rows, of transverse grooves with high mean pitches and such that the ratio of the mean pitch divided by the mean depth of the grooves is greater than 2.00.

In fact, it would appear that the combination of a hidden-voids volume designed to appear at the surface of the tread following partial wearing of this tread with these specifications regarding the transverse cuts yields a mechanical equilibrium that is particularly advantageous and, in theory, surprising to those skilled in the art on the basis of their knowledge.

In each intermediate row, the depths of the cuts may be identical or similar to one another. The same is true of the edge rows.

Edge corners of transverse overall orientation should be understood to mean that the edge corners make with the axial (or transverse) direction an angle which may be non-zero; this angle is at most equal to 50°.

For preference, such a tire is intended to be fitted to a driven (or "drive") axle of a heavy goods vehicle for which the driving and braking torques applied to the tires place significant load on the treads of those tires in the contact patch.

According to a preferred alternative form of the invention, the volume of voids that are open onto the tread surface in the new state is at most equal to 13% and more preferably still is less than 10%.

For preference, the invention, in certain embodiments, applies to treads of which the total thickness to be worn away PMU (this thickness PMU including the part associated with a potential regrooving operation) is at most equal to 23 mm.

According to an alternative form of the invention, the tread is such that, in the new state, the first hidden voids open onto the tread surface following partial wear representing at least 20% of the thickness PMU and at most 70% of that same thickness.

According to an alternative form of the invention, the tread is such that, in the new state, at least part of the cuts formed on the intermediate rows and on the edge rows comprise a first part opening onto the tread surface in the new state which is extended by a second part. The first part is formed of a sipe while the second is a cavity in the form of a channel comprising two ends opening to the outside in another cavity (groove, channel). This channel may be temporarily blocked, namely is filled with an insert or a material during the tire-building phases and which can be removed following partial wear in order to form a new groove that opens onto the tread surface.

According to another alternative form, the tread according to the invention is such that, with each sipe being delimited by opposing faces, these faces comprise means of mechanically blocking the relative movements of the said faces relative to one another. Such means may, for example, take the form of bosses and recesses.

According to another alternative form of the invention, the tread is such that a plurality of channels or cavities extend into the thickness of the tread down to a depth greater than the maximum thickness of material to be worn away PMU and at most down to the total thickness E. Thus, even after the maximum legal wear limit has been reached, the tire retains edge corners and enough drainage volume to drive safely.

Advantageously, the tread according to the invention as described is designed to equip a tire the recommended use of which is that it may be mounted on a driven axle of a heavy goods vehicle.

Other features and advantages of embodiments of the invention will emerge from the description given hereinafter with reference to the attached drawings which, by way of nonlimiting examples, depict alternative forms of embodiment of the subject matter of the invention.

DETAILED DESCRIPTION OF SPECIFIC EMBODIMENTS

In the figures that accompany this description, identical reference symbols may be used to describe alternative forms of the invention if these reference symbols refer to elements of the same nature, whether this is a structural or alternatively a functional nature.

Figure 1:
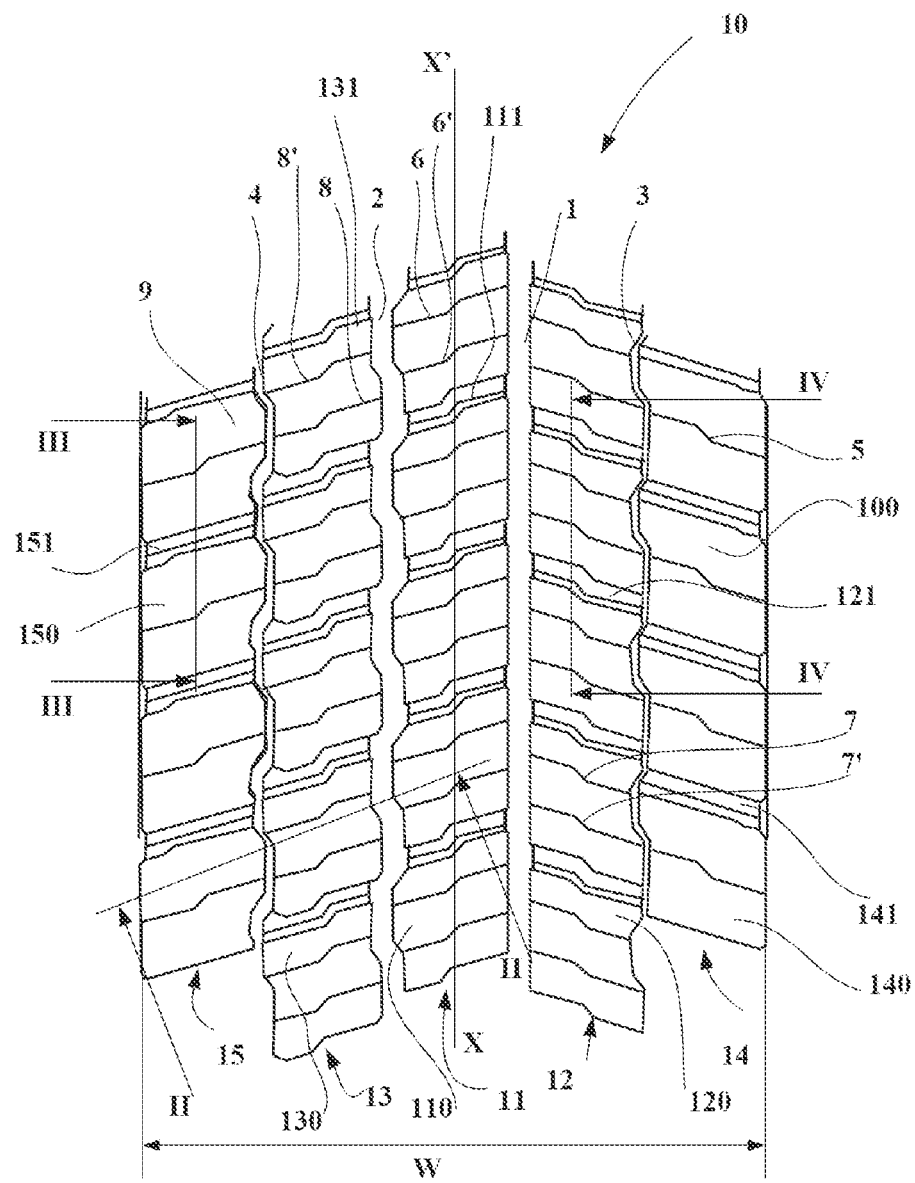
FIG. 1 shows a plan view of part of a tread of a tire according to an embodiment of the invention.

FIG. 1 is a plan view of part of a tread 10 of a tire according to an embodiment of the invention. This tire, of size 315/70 R 22.5, is intended to be fitted to a driven axle of a heavy goods vehicle. This tire comprises a crown reinforcement, not depicted in this figure, and, surmounting this crown reinforcement, a tread 10 of which the tread surface 100 in the new state (namely prior to any running) may be seen; the tread surface corresponds to the radially outermost surface intended to come into contact with a roadway when the tire is being driven on.

This tread of width W equal to 280 mm is provided with four main grooves 1, 2, 3, 4 of circumferential overall orientation which divides the tread into five circumferential rows 11, 12, 13, 14, 15. These five rows comprise two edge rows 14, 15 axially delimiting the width of the tread and three intermediate rows 11, 12, 13.

Figure 2:
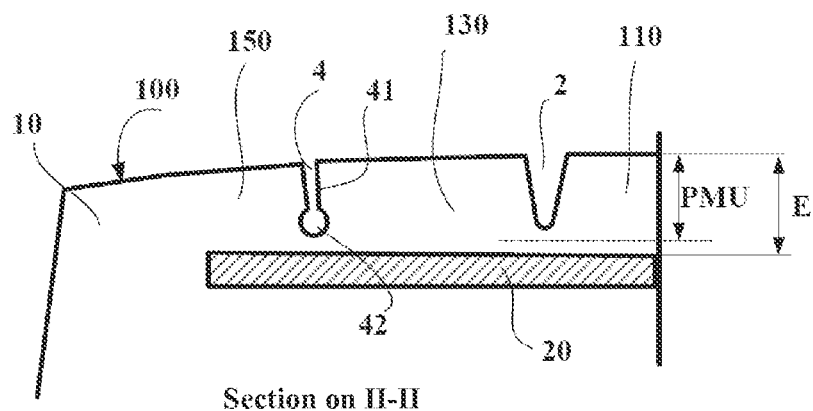
FIG. 2 shows a view in section on a plane that is oblique with respect to the axis of rotation of the tire, this plane being identified by its line II-II in FIG. 1.

The main circumferential grooves 1, 2, 3, 4 have the same depth, here equal to 17 mm. The two circumferential grooves 1, 2 flanking the central row 11 formed on the equatorial plane XX' (the plane that divides the tread into two parts of equal width) have a mean width on the tread surface equal to 10.5 mm. The other two circumferential grooves 3, 4 have a width equal to 3.5 mm on the same tread surface. The latter grooves 3, 4 widen from a depth equal to 11 mm so as to be able to form grooves of width equal to 6 mm as can be seen in FIG. 2 which is a section on a plane sectioning the tread surface along the oblique line II-II.

Furthermore, this tread is designed to allow an operation referred to as "regrooving", namely that each main groove 1, 2, 3, 4 can, before the tread wear limit is reached, undergo a mechanical regrooving operation to recreate a groove having a mean depth of a few millimeters. In this particular instance, the maximum height of material to be worn away, which corresponds to a thickness referred to as "PMU" is, in the new state, equal to 20 mm (which corresponds to the groove depth of 17 mm plus a thickness of 3 mm designed to allow the regrooving operation).

Figure 4:
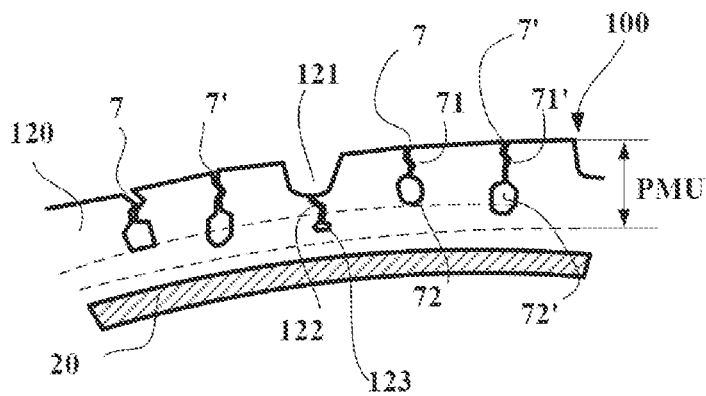
FIG. 4 shows a view in section on a plane perpendicular to the axis of rotation and sectioning an intermediate row and identified on the tread shown in FIG. 1 by its line IV-IV.

The intermediate rows 11, 12, 13 are provided with transverse cuts arranged at a mean pitch Pi equal to 22 mm as can also be seen in FIG. 4. These cuts comprise both transverse grooves 111, 121, 131—of a width of 10.5 mm—these grooves opening onto the tread surface in the new state and with the circumferential main grooves delimiting tread blocks 110, 120, 130, and sipes 6, 6', 7, 7', 8, 8'—of a width of 0.4 mm—of which there are two per block. The mean pitch Pi of the transverse cuts on the intermediate rows is evaluated over a complete turn, taking all of the transverse cuts (both the transverse grooves and the transverse sipes) into consideration.

The mean depth Di of the transverse cuts on the intermediate rows 11, 12, 13 is equal to the mean of the maximum depths of all the transverse cuts; in this particular instance it is equal to 15.3 mm.

Figure 3:
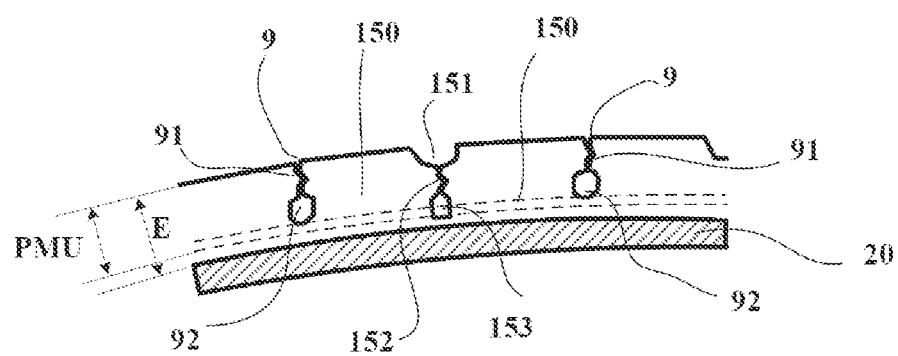
FIG. 3 shows a view in section on a plane sectioning an edge rib and perpendicular to the axis of rotation; this plane is identified on the tread shown in FIG. 1 by its line III-III.

The edge rows 14, 15 are provided with transverse cuts arranged at a mean pitch Pe equal to 33 mm as can also be seen in FIG. 3. These cuts comprise both transverse grooves 141, 151—of a width of 10.5 mm—delimiting with the circumferential main grooves tread blocks 140, 150, and sipes 5, 9—of a width of 0.4 mm—of which there is one sipe per block. The mean pitch Pe of the transverse cuts is evaluated over a full turn taking all of the said transverse cuts of each edge row (both the transverse grooves and the transverse sipes) into consideration.

The mean depth De of the transverse cuts on the edge rows is equal to the mean of the maximum depths of all the transverse cuts; in this particular instance it is equal to 14.7 mm.

The tread pattern with which the tread of the alternative form described here is provided is asymmetric with respect to the equatorial plane, this asymmetry being obtained by having the inclination of the transverse cuts the same on one edge row and two intermediate rows and the transverse cuts on the last intermediate row and the other edge row inclined in the opposite direction.

FIG. 2 shows a view in section of part of the tire, this section being made in an oblique plane substantially parallel to the inclination of the transverse cuts, this plane being identified by its line II-II in FIG. 1.

This FIG. 2 shows part of the crown reinforcement 20 extending on each side of the equatorial plane P that divides the tire into two parts. This equatorial plane P intersects the blocks 110 of the central row. The tread has a thickness E measured on the equatorial plane between the radially outermost point of the crown reinforcement 20 and the radially outermost point of the tread. The maximum thickness of tread to be worn away during running is identified by the thickness PMU measured between the tread surface and a regrooving thickness radially on the inside of the bottom of the groove 2.

Surmounting this reinforcement 20 radially on the outside is the tread 10 comprising a groove 2 oriented circumferentially and a sipe 4, these two cuts opening onto the tread surface 100 in the new state. The sipe 4 is extended by a channel 42. The maximum depths of the cuts 2 and 4 are, in this particular instance, identical.

FIG. 3 shows a view in section on a plane sectioning an edge rib and perpendicular to the axis of rotation and identified on the tread shown in FIG. 1 by its line III-III.

As can be seen in FIG. 3, the transverse cuts are either grooves 151 extended towards the inside of the tread by zigzag sipes 152, each of the said sipes 152 itself being extended by a channel 153, or sipes 9 formed of a zigzag first part 91 extended by a channel 92. The maximum depth of the sipes 9 is equal to 13.0 mm, whereas the depth of the channel 153 is equal to 16.5 mm (the latter depth corresponds to the distance separating the bottom of the channel 153 from the tread surface in the new state). This leads to a mean depth Di equal to 14.7 mm. The grooves 151 delimit the blocks 150 in which the sipes 9 are formed.

The sipes 9 have a width of 0.4 mm and a zigzag geometry to encourage mechanical blocking of opposing walls. These sipes 9 are able to close up at least in part as they pass through the contact patch during running Each sipe 9 is extended towards the inside of the tread by a channel 92 of a height equal to 6 mm and a width equal to 4 mm. Each channel 92 is designed to open onto the tread surface after 6 mm of tread wear in order to form new grooves.

The grooves 151 have a width equal to 10 mm and a depth equal to 4.0 mm; these grooves 151 are extended by a sipe 152 of a width of 0.4 mm, this sipe itself being extended by a channel 153 which is 6 mm wide and 4 mm deep.

FIG. 4 shows a view in section on a plane sectioning an intermediate row and perpendicular to the axis of rotation and identified on the tread shown in FIG. 1 by its line IV-IV.

This section shows a groove 121 opening onto the tread surface 100 and extended by a sipe 122, this sipe being extended by a channel 123 of the following dimensions: 3 mm wide and 1.5 mm deep. The maximum depth of the channel 123 is equal to 16.5 mm (the latter depth corresponds to the distance separating the bottom of the channel 123 from the tread surface in the new state).

Between two grooves 121 can be seen two cuts 7, 7' comprising a first part formed of a zigzag sipe 71, 71' in the depth of the tread, these sipes 71, 71' being extended by channels 72, 72' of identical dimensions. In order to keep tread wear even, it is sensible for the new grooves formed by the channels not all to appear at the same time (namely beyond one and the same degree of partial wear). Furthermore, the sipes 7 have a maximum depth equal to 13 mm whereas the sipes 7' have a maximum depth equal to 16.5 mm.

The mean of the depths Di of the transverse cuts in each intermediate row is, in this particular instance, equal to 15.3 mm.

In this particular instance, all of the circumferential grooves and transverse cuts together constitute, in the new state, a total void volume Vco open to the tread surface which is equal to 1900 cm$^3$. This total volume Vco does not include the volumes of hidden voids (namely the volume of the channels which are intended to form new grooves following partial wear) nor does it include the volume of the sipes formed under the tread surface.

The channels form a hidden void of total volume Vcc equal in this particular instance to 720 cm$^3$ (namely 37% of the total void volume Vco open to the tread surface in the new state).

The total volume Vt is equal to the sum of the volumes of material to be worn away Vmu and of all the voids, whether these be open or hidden. In this particular instance, the total volume Vt is equal to 14 640 cm$^3$.

In consequence, the hidden volume Vcc represents around 5% of the total volume Vt of the tread as defined above, and the open-voids volume Vco is equal to 13% of that same total volume Vt.

In this example of a tire according to the invention, the recommended relationships are satisfied because: on the edge rows, the ratio Pe/De is equal to 2.24, and on the intermediate rows, the ratio Pi/Di is equal to 1.44. Furthermore, the mean pitch Pe of the cuts on the edge rows is equal to 1.5 times the mean pitch Pi on the intermediate rows.

With the invention having been described in general terms and by means of one alternative form, it must be appreciated that this invention is not in any way restricted to the single alternative form described alone. It is clear that various modifications can be made thereto without departing from the overall scope of the present invention. In particular, the geometries of the channels and sipes may be adapted as need be. Grooves such as those described in patent application WO 2011/039194-A1 may advantageously be employed within the context of the present invention.

The invention claimed is:

1. A tread for a tire, having a tread surface adapted to come into contact with a roadway, the tread having a width W and a total thickness E, the total thickness E corresponding to the total thickness of material measured on the equatorial plane between the tread surface when the tire is in the initial or new state and the radially outermost part of a crown reinforcement, the tread having a maximum thickness PMU of material to be worn away during running, the maximum thickness PMU being less than the total thickness E, comprising:
    at least two grooves of circumferential overall orientation delimiting at least one intermediate row of suffix (i) and two edge rows of suffix (e), these edge rows axially delimiting the tread in the width W thereof,
    a plurality of cuts of transverse overall orientation which are formed on each of the intermediate and edge rows, all of the grooves of circumferential overall orientation and cuts of transverse overall orientation representing, in the new state, a void of total volume Vco open onto the tread surface (open-voids volume), the volume Vco being at most equal to 16% of the total volume Vt of the tread, the total volume Vt being equal to the sum of the volumes of material to be worn away and of all the voids,
    channels or cavities under the tread surface when the tread is in the new state, these channels forming a hidden void of total volume Vcc and being adapted to form new grooves after the tread has partially worn away, this hidden void having, in the initial state, a total volume Vcc at least equal to 30% of the total void volume Vco opening onto the tread surface in the new state,
    wherein the at least one intermediate row of suffix (i) and the at least one edge row of suffix (e) are each provided with a plurality of cuts of transverse or oblique orientation distributed over each row evenly or near-evenly with a mean pitch of respectively Pi in the case of the intermediate rows and Pe in the case of the edge rows, these cuts having mean depths, Di and De respectively, which are at least equal to 20% of the thickness PMU and at most equal to this same thickness PMU,
    wherein:
    on the edge rows, the mean pitch Pe of the cuts is determined so that the relationship 1.30<Pe/De<3.00 is satisfied, and
    on the intermediate rows, the mean pitch Pi of the cuts satisfies the relationship 1.00<Pi/Di<1.70, and
    the mean pitch Pe of the cuts on the edge rows is greater than the pitch Pi on the intermediate rows.

2. The tread according to claim 1, wherein the pitch Pe of the cuts on the edge rows and the pitch Pi on the intermediate rows satisfy the relationship: 1.25<Pe/Pi<1.80.

3. The tread according to claim 1, wherein the open-voids volume Vco in the new state is at most equal to 13% of the total volume Vt of the tread.

4. The tread according to claim 1, wherein the open-voids volume Vco in the new state is at most equal to 10% of the total volume Vt of the tread.

5. The tread according to claim 1, wherein first hidden voids open onto the tread surface following partial wear representing at least 20% of the thickness PMU and at most 70% of that same thickness.

6. The tread according to claim 1, wherein the total thickness to be worn away PMU, which thickness includes any part associated with potential regrooving, is at most equal to 23 mm.

7. The tread according to claim 1, wherein a plurality of channels extend into the thickness of the tread down to a depth greater than the maximum thickness of material to be worn away PMU and at most down to the total thickness E.

8. A heavy goods vehicle tire, this tire comprising a carcass reinforcement surmounted by a crown reinforcement, this crown reinforcement extending on either side of an equatorial plane that divides the tire into two equal or substantially equal parts, this tire comprising, radially on the outside of the crown reinforcement, a tread according to claim 1, this tire being mountable on a driven axle of a heavy goods vehicle.

* * * * *